(12) United States Patent
Simpson et al.

(10) Patent No.: US 10,100,889 B2
(45) Date of Patent: Oct. 16, 2018

(54) REACTIVE SINTERING TO ELIMINATE METAL INSERTS IN CARBON-CARBON BRAKE DISCS

(71) Applicant: Honeywell International Inc., Morristown, NJ (US)

(72) Inventors: Allen H. Simpson, Buchanan, MI (US); Mark L. La Forest, Granger, IN (US); Gregory Vanderheyden, South Bend, IN (US); Alexander Mukasyan, Granger, IN (US)

(73) Assignees: Honeywell International Inc., Morris Plains, NJ (US); The University of Notre Dame Du Lac, Notre Dame, IN (US)

( * ) Notice: Subject to any disclaimer, the term of this patent is extended or adjusted under 35 U.S.C. 154(b) by 891 days.

(21) Appl. No.: 13/891,994

(22) Filed: May 10, 2013

(65) Prior Publication Data
US 2013/0243953 A1 Sep. 19, 2013

Related U.S. Application Data

(62) Division of application No. 12/196,511, filed on Aug. 22, 2008, now abandoned.

(51) Int. Cl.
*F16D 65/12* (2006.01)
*F16D 69/02* (2006.01)

(52) U.S. Cl.
CPC ......... *F16D 65/127* (2013.01); *F16D 65/125* (2013.01); *F16D 65/126* (2013.01); *F16D 69/025* (2013.01); *F16D 2200/0039* (2013.01); *F16D 2250/0053* (2013.01)

(58) Field of Classification Search
CPC .... F16D 65/125; F16D 65/126; F16D 65/127; F16D 69/025; F16D 2250/0053
USPC ........... 188/18 A, 218 XL, 71.5, 73.1; 419/9
See application file for complete search history.

(56) References Cited

U.S. PATENT DOCUMENTS

| | | | |
|---|---|---|---|
| 3,552,533 A | 1/1971 | Nitz et al. | |
| 4,742,948 A | 5/1988 | Fisher et al. | |
| 4,800,065 A * | 1/1989 | Christodoulou et al. | 420/129 |
| 4,815,572 A | 3/1989 | Froberg et al. | |
| 5,273,140 A | 12/1993 | Berwanger | |
| 5,340,014 A * | 8/1994 | Sekhar et al. | 228/198 |

(Continued)

FOREIGN PATENT DOCUMENTS

| | | |
|---|---|---|
| EP | 1 632 465 | 3/2006 |
| GB | 1 416 853 | 11/1975 |

(Continued)

*Primary Examiner* — Bradley T King
(74) *Attorney, Agent, or Firm* — Shumaker & Sieffert, P.A.

(57) ABSTRACT

A brake disc rotor or stator is manufactured with slots in the interior face of the disc. A paste comprised of a fine powder of a carbide-forming metal along with fine carbon powder, suspended in an organic binder, is applied to the force-bearing areas in the rotor slot faces or the stator slot faces. The disc is then placed into a furnace in a nitrogen atmosphere and heated to the ignition temperature. When the furnace reaches the ignition temperature, a combustion reaction begins that creates a molten liquid ceramic material on the slot face. Upon cooling, the resulting brake disc has a tough, hard, abrasion-resistant ceramic surface on the portion of the brake disc slot that bears pressure.

19 Claims, 2 Drawing Sheets

(56) References Cited

U.S. PATENT DOCUMENTS

| | | |
|---|---|---|
| 2005/0221051 A1* | 10/2005 | Simpson et al. ............ 428/66.2 |
| 2007/0175709 A1 | 8/2007 | Scelsi et al. |
| 2007/0193836 A1 | 8/2007 | Walker et al. |
| 2007/0235123 A1 | 10/2007 | Simpson et al. |
| 2007/0235126 A1 | 10/2007 | Simpson et al. |
| 2010/0044170 A1 | 2/2010 | Simpson et al. |

FOREIGN PATENT DOCUMENTS

| | | |
|---|---|---|
| JP | 7-224390 | 2/1994 |
| WO | 2005/102962 | 11/2005 |

\* cited by examiner

REACTIVE SINTERING TO ELIMINATE METAL INSERTS IN CARBON-CARBON BRAKE DISCS

This application is a divisional of U.S. patent application Ser. No. 12/196,511, filed Aug. 22, 2008, which published as U.S. Patent Application Publication No. 2010/0044170 on Feb. 25, 2010, the entire content of which is incorporated herein by reference.

FIELD OF THE INVENTION

This invention relates to carbon-carbon composite brake discs, and more particularly, to brake disc drive insert slots in carbon-carbon composite brake discs. The present invention provides an improved surface within the brake disc drive insert slots.

BACKGROUND OF THE INVENTION

Carbon-carbon composite brake discs used in the aerospace industry typically have metal inserts attached to them. Specifically, the metal inserts are attached to slots in the interior times of the brake discs (rotors or stators). Those slots function to facilitate the transmission of torque to the brake discs. The metal inserts for stator serve to provide a surface that will transmit torque from the torque tube of the axle to the brake disc without crashing the face of the carbon-carbon composite material. Rotor inserts are used as the media to transmit toque form the wheel drive key interface to the brake discs. The metal inserts—typically held in place by rivets, adhesive, etc.—serve this purpose. However, they are relatively expensive additions to the brake discs. Labor is expended drilling holes for and attaching the inserts. Damage sometimes occurs to the carbon-carbon brake disc during installation or removal of rivets. Also, the inserts add significant weight to the brake assembly.

U.S. Pat. No. 5,273,140 describes a brake disc annular drive insert which comprises a generally cylindrical member with radially extending flanges at opposite axial, ends thereof. The drive insert includes a generally cylindrical body having an opening at one side thereof which extends diametrically into the body and terminates at a point between the center of revolution of the body and an outer surface of the body. The opening in the body extends to an inner surface of the body to provide a generally rectangular opening for receiving a spline of a torque tube. The drive insert is typically made of steel. The flanges of the drive insert may comprise either generally annular flanges shaped complementary with the generally cylindrical body and or may be truncated at a side opposite the opening in the body.

U.S. 2007/0175709 describes brake disc drive inserts for use in carbon-carbon composite brake discs. A rotatable brake disc annular drive insert includes a cylindrical steel body having one side of the body truncated to provide an insert opening which extends axially through the body. The insert opening extends into the body along a diameter of the body and the insert opening terminates at a radially extending surface located between the revolutional center of the body and an outer surface of the body. End flanges extend radially outwardly from the outer surface of the body to provide for axial positioning of the drive insert relative to a brake disc. The insert opening has a lining comprising carbon-carbon composite material. This low friction carbon-carbon composite material bed that is positioned between the steel insert component and the torque tube spline location provides significantly lower friction and enables significantly greater disc clamping and brake torque.

Other prior art of interest includes: U.S. 2007/0235126 A1, entitled BONDING OF CARBON-CARBON COMPOSITES USING TITANIUM CARBIDE; U.S. 2007/0235123 A1, entitled APPARATUS AND METHODS FOR BONDING CARBON-CARBON COMPOSITES THROUGH A REACTANT LAYER; copending application Ser. No. 11/730,373, entitled BONDING OF CARBON FIBERS TO METAL INSERTS FOR USE IN COMPOSITES; and U.S. 2007/0193836 A1, entitled METHOD AND BRAKE DISC WITH COMPOSITE INSERT MEMBER.

SUMMARY OF THE INVENTION

The present invention eliminates the need for inserts, and the drilling of rivet holes. Instead, the present invention toughens the face of the carbon-carbon composite material so that it will not crush under pressure.

In accordance with this invention, a brake disc rotor or stator is manufactured by conventional methods through the final machining process which provides slots in the interior ice of the brake disc. At that point, this invention applies a paste to the areas where throe is applied to the rotor slot faces or to the stator slot faces. The paste is comprised of a fine powder of a carbon-forming metal along with fine carbon powder. The metal and carbon powders are suspended in an organic binder. The disc is then placed into a furnace in a nitrogen atmosphere and heated to the ignition temperature. When the furnace reaches the ignition temperature, a combustion reaction begins that creates a molten liquid ceramic material on the slot face. The ceramic created in this way "cools" very quickly to the temperature of the carbon-carbon composite. The brake disc is then cooled to ambient temperature. The resulting brake disc has a tough, hard, abrasion-resistant ceramic surface on the portion of the brake disc slot that bears pressure. At this point, the discs are processed through additional standard processes, such as application of antioxidant.

BRIEF DESCRIPTION OF THE DRAWINGS

The following drawings are illustrative only, and non-limiting. They illustrate possible ways in which the present invention, which toughens the face of the carbon-carbon compose material, may be implemented. However, persons skilled in the art will readily envision other ways in which the benefits of the present invention may be obtained.

DETAILED DESCRIPTION OF THE INVENTION

Figure 1A:
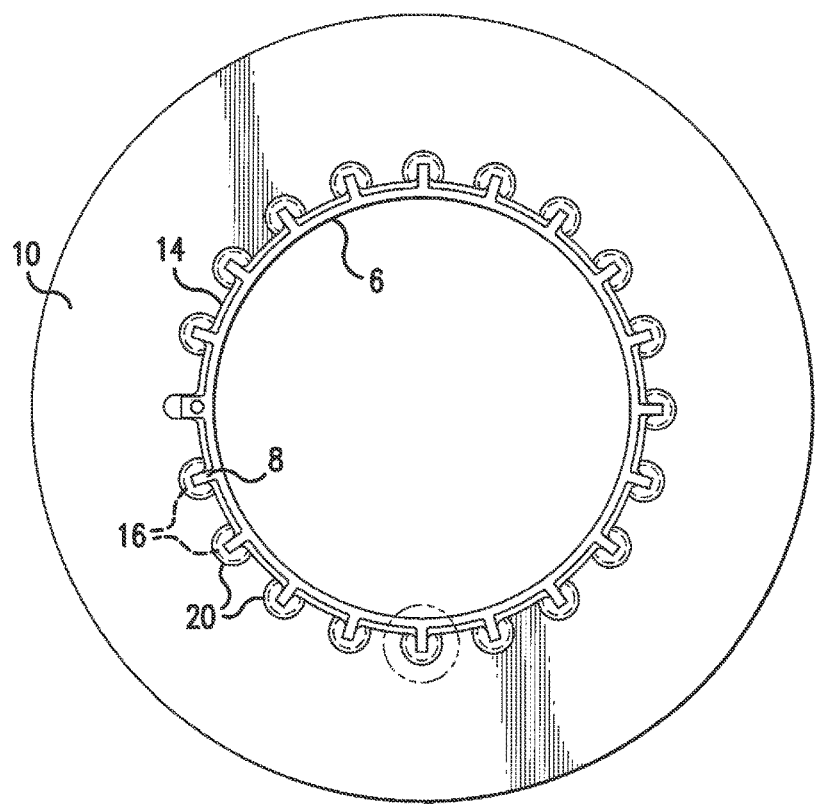
FIG. 1A is a top plan view of a known type of aircraft carbon-carbon composite brake disc stator coupled with a torque tube via annular drive inserts.

This invention provides a method of manufacturing a brake disc rotor or brake disc suitor, wherein the rotor or stator has a tough, hard, abrasion-resistant ceramic surface on the portion of the brake disc slot that hears pressure. The method of the invention includes the following four steps.

Step (1) contemplates providing a carbon-carbon composite brake disc rotor or stator having slot slots in the interior face of said brake disc. These brake disc rotors or stators are manufactured by conventional methods through the final machining process which provides slots in the interior faces of the brake discs.

Step (2) contemplates applying a paste, comprised of a fine powder of titanium zirconium, hafnium, and/or vanadium along with fine carbon powder suspended in an organic binder, to the areas where force will be applied to the rotor or stator slot faces. In a preferred embodiment, the fine powder is titanium powder having an average particle diameter ranging from 25 to 250 microns. In a more preferred embodiment, the average particle diameter of the titanium powder is about 45 microns. In a preferred embodiment, the carbon powder is powdered graphite and the average diameter of the graphite particles ranges from 1 to 10 microns. In a more preferred embodiment, the average particle diameter of the graphite particles is about 2 microns. In a preferred embodiment, the mole ratio of metal powder to carbon powder ranges from 3:1 to 0.5:1. In a preferred embodiment, the organic binder is a phenolic binder, an epoxy binder, or an alginate binder. In a preferred embodiment, the paste is applied to the areas where force will be applied to the rotor or stator slot faces in a thickness ranging from 30 microns to ¼ inch. In an especially preferred embodiment, the paste is a layer of titanium powder and carbon powder about 1/16 inch in thickness.

Step (3) contemplates placing the disc into a furnace having a nitrogen-containing atmosphere, and heating the disc to the ignition temperature in a preferred embodiment, the furnace is provided with an atmosphere containing nitrogen—for instance, air or pure nitrogen gas—at a pressure ranging from 0.2 to 20 atmospheres. In a preferred embodiment, this heating step is conducted at a temperature of from 400-600° C.

Step (4) contemplates cooling the brake disc to ambient temperature. When the furnace in step (3) reaches the ignition temperature, a combustion reaction begins that creates a molten liquid ceramic material on the slot faces in the brake discs. The ceramic created in this way "cools" very quickly to the temperature of the carbon-carbon composite. This initial rapid cooling is followed by cooling the brake disc to ambient temperature, generally by the application of cooling means such as refrigerants and/or blowing air.

This invention also provides a slotted brake disc rotor or slotted brake disc stator which has a tough, hard, abrasion-resistant ceramic surface on the portion of the brake disc slot that beau pressure said rotor or stator being manufactured by a method of described above.

Examples of the metals which may be used in this invention are titanium, zirconium, hafnium, end/or vanadium. Titanium carbide provides a ceramic with an especially high specific heat. These metal powders typically ignite at around 450° C. in a nitrogen atmosphere. Reaction between nitrogen and metal provides the low ignition temperature.

Examples of binders which may be used in this invention include phenolic hinders, epoxy binders, and alginates. However, any organic binder which can provide a paste of the metal powder being used can be employed.

With reference to FIG. 1A, an aircraft carbon-carbon composite brake disc stator 10 is generally annular in shape and includes a central generally annular opening 14. A plurality of slot openings or recesses receiving therein brake disc annular drive inserts 20 is located about the periphery of opening 14. Recesses 16 of disc 10 are generally annularly shaped slots extending radially outwardly from opening 14 of disc 10. Annular drive inserts 20 couple torque tube 6 with disc 10. The torque tithe is non-rotatably coupled with an axle (not shown) of an aircraft.

Figure 1B:
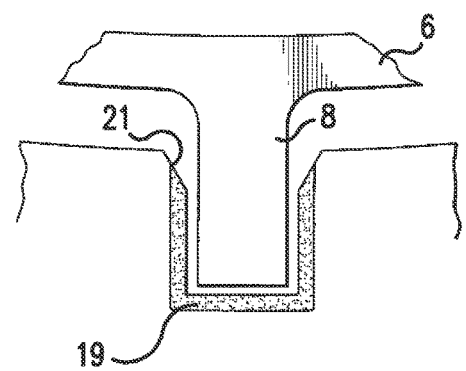
FIG. 1B is an enlarged view corresponding to the circled section of FIG. 1A, but modified in accordance with the present invention.

As illustrated in FIG. 1B, torque tube 6 includes radially extending short spines 8 which extend within the respective annular drive slots or openings 21. In accordance with the present invention, each opening 21 (slot) is lined with an area of toughened carbon-carbon composite material 19.

Figure 2A:
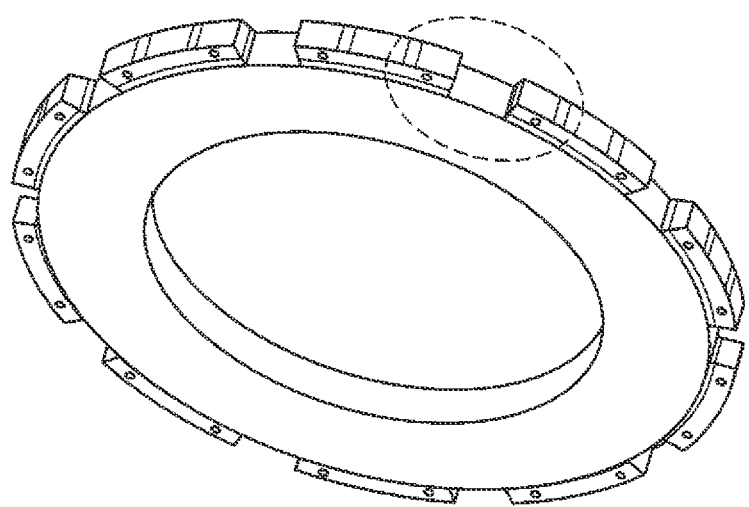
FIG. 2A is an isometric view of a known type of aircraft carbon-carbon composite brake disc rotor.

FIG. 2A shows an aircraft carbon-carbon composite brake disc stator that is generally annular in shape and that includes a central generally annular opening. A plurality of slot openings or recesses is located, about the outer periphery of the rotor.

Figure 2B:
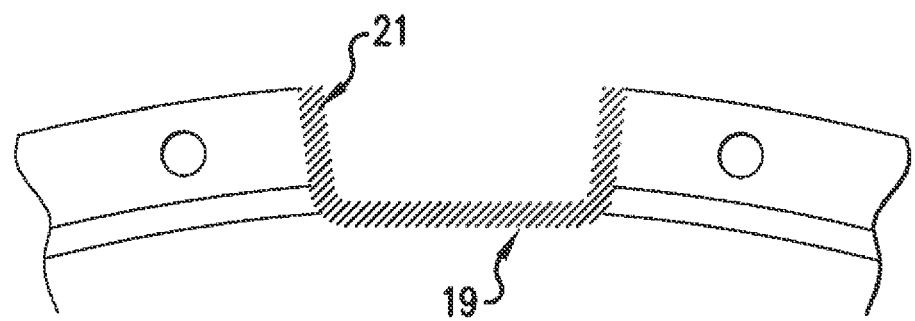
FIG. 2B is an enlarged view corresponding to the circled section of FIG. 2A, but modified in accordance with the present invention.

As illustrated in FIG. 2B, in accordance with the present invention, each opening 21 (slot) is lined with an area of toughened carbon-carbon composite material 19.

EXAMPLES

Example 1

A paste is prepared from 1.0 mol of titanium powder and 0.8 mol of carbon powder in a liquid phenolic binder. This paste is applied in a layer approximately ⅛ inch thick to the faces of slot slots in a carbon-carbon composite brake disc stator. The composite disc having the paste-lined slot slots is placed in a furnace which has a pure nitrogen atmosphere at 1 atmosphere of pressure. Ignition occurs at about 410° C. The maximum combustion temperature reached is 2340° C. The resulting ceramic layer on the faces of the slot slots comprises 0.9 mol TiC and 0.1 mol TiN. This ceramic layer is a refractory material which is stable up to about 3000° C. and which has a Rockwell Hardness, A scale, of about 80 HRA.

Example 2

A paste is prepared from 1.0 mol of zirconium powder and 1.0 mol of carbon powder in a liquid epoxy binder. This paste is applied in a layer approximately 3/16 inch thick to the faces of slot slots in a carbon-carbon composite brake disc rotor. The composite disc having the paste-lined slot slots is placed in a furnace which has an air (nitrogen, oxygen, etc) atmosphere at 0.5 atmospheres of pressure. Ignition occurs at about 600° C. The maximum combustion temperature reached is 2500° C. The resulting ceramic layer on the faces of the slot slots comprises 1.0 mol ZrC and 0.2 mol ZrN. This ceramic layer is a refractory material which is stable up to about 3200° C. and which has a Rockwell Hardness, A scale, of about 95 HRA.

Example 3

A paste is prepared from 1.0 mol of vanadium powder and 0.5 mol of carbon powder in a liquid alginate binder. This paste is applied it a layer approximately 1/16 inch thick to the faces of slot slots in a carbon-carbon composite brake disc stator. The composite disc having the paste-lined slot slots is placed in a furnace which contains pressurized nitrogen gas. Ignition occurs at about 410° C. The maximum combustion temperature reached is 2400° C. The resulting ceramic layer on the faces of the slot slots comprises 1.0 mol VC and 0.25 mol VN. This ceramic layer is a refractory material which is stable up to about 3000° C. and which has a Rockwell Hardness, A scale, of about 90 HRA.

While the present invention has been described with respect to detailed examples of its implementation, the invention is capable of numerous modifications, rearrangements, and alterations, and such are intended to be within the spirit and scope of the foregoing disclosure and the appended claims.

What is claimed is:

1. A method comprising:
   forming a ceramic layer on a slot face of a brake disc rotor or stator, wherein the brake disc rotor or stator comprises a surface including a slot, wherein the slot defines the slot face, and wherein forming the ceramic layer on the slot face comprises:
   applying a paste to the slot face of the brake disc rotor or stator, wherein the paste comprises a fine powder suspended in an organic binder;
   heating the brake disc rotor or stator at least to an ignition temperature of the paste in an atmosphere comprising nitrogen to initiate a combustion reaction that forms the ceramic layer on the slot face of the brake disc rotor or stator; and
   cooling the brake disc rotor or stator to ambient temperature, wherein, upon cooling, the ceramic layer resists abrasion, wherein the fine powder comprises metal powder and carbon powder, and wherein a molar ratio of the metal powder to the carbon powder is between 3:1 and 0.5:1.

2. The method of claim 1, wherein the organic binder comprises a phenolic binder, an epoxy binder, or an alginate binder.

3. The method of claim 1, wherein applying the paste to the slot face of the brake disc rotor or stator comprises applying the paste to the slot face in a thickness between 30 microns and 0.25 inches.

4. The method of claim 1, wherein the fine powder comprises titanium powder.

5. The method of claim 4, wherein an average particle diameter of the titanium powder is between 25 microns and 250 microns.

6. The method of claim 4, wherein an average particle diameter of the titanium powder is about 45 microns.

7. The method of claim 1, wherein the fine powder comprises powdered graphite and wherein an average particle diameter of the powdered graphite is between 1 micron and 10 microns.

8. The method of claim 7, wherein the average particle diameter of the powdered graphite is about 2 microns.

9. The method of claim 1, wherein the atmosphere comprising nitrogen is air.

10. The method of claim 1, wherein the atmosphere is pure nitrogen gas.

11. The method of claim 1, wherein heating the brake disc rotor or stator at least to the ignition temperature comprises heating the brake disc rotor or stator at a temperature between 400 degrees Celsius and 600 degrees Celsius.

12. The method of claim 1, wherein the fine powder comprises at least one of titanium, zirconium, hafnium, or vanadium.

13. The method of claim 1, wherein forming the ceramic layer on the slot face of the brake disc rotor or stator comprises forming the ceramic layer directly on the slot face of the brake disc rotor or stator.

14. The method of claim 1, wherein heating the brake disc rotor or stator at least to the ignition temperature of the paste comprises placing the brake disc rotor or stator including the paste applied to the slot face into a furnace comprising the atmosphere comprising nitrogen.

15. The method of claim 1, wherein one or more exterior surfaces of the brake disc rotor or stator define an inner circumference of the brake disc rotor or stator, an outer circumference of the brake disc rotor or stator, and a plurality of slots along at least one of the inner circumference or the outer circumference, wherein the one or more exterior surfaces comprise a plurality of slot faces, and each slot of the plurality of slots defines a slot face of the plurality of slot faces, the method further comprising forming the ceramic layer on each slot face of the plurality of slot faces.

16. The method of claim 1, wherein the combustion reaction creates a molten liquid ceramic material on the slot face of the brake disc rotor or stator.

17. The method of claim 1, wherein the slot is configured to receive a spline of a torque tube.

18. The method of claim 1, wherein the metal powder comprises a carbide-forming metal powder.

19. A method comprising:
   forming a ceramic layer on a slot face of a brake disc rotor or stator, wherein the brake disc rotor or stator comprises a surface including a slot, wherein the slot defines the slot face, and wherein forming the ceramic layer on the slot face comprises:
   applying a paste to the slot face of the brake disc rotor or stator, wherein the paste comprises a fine powder suspended in an organic binder;
   heating the brake disc rotor or stator at least to an ignition temperature of the paste in an atmosphere comprising nitrogen to initiate a combustion reaction that forms the ceramic layer on the slot face of the brake disc rotor or stator; and
   cooling the brake disc rotor or stator to ambient temperature, wherein, upon cooling, the ceramic layer resists abrasion, wherein the atmosphere contains nitrogen at a pressure between 0.2 and 20 atmospheres.

* * * * *